No. 888,700. PATENTED MAY 26, 1908.
W. C. FOWNES, Jr. & R. J. GARDNER.
MINING CAR WHEEL BEARING.
APPLICATION FILED MAY 15, 1907.
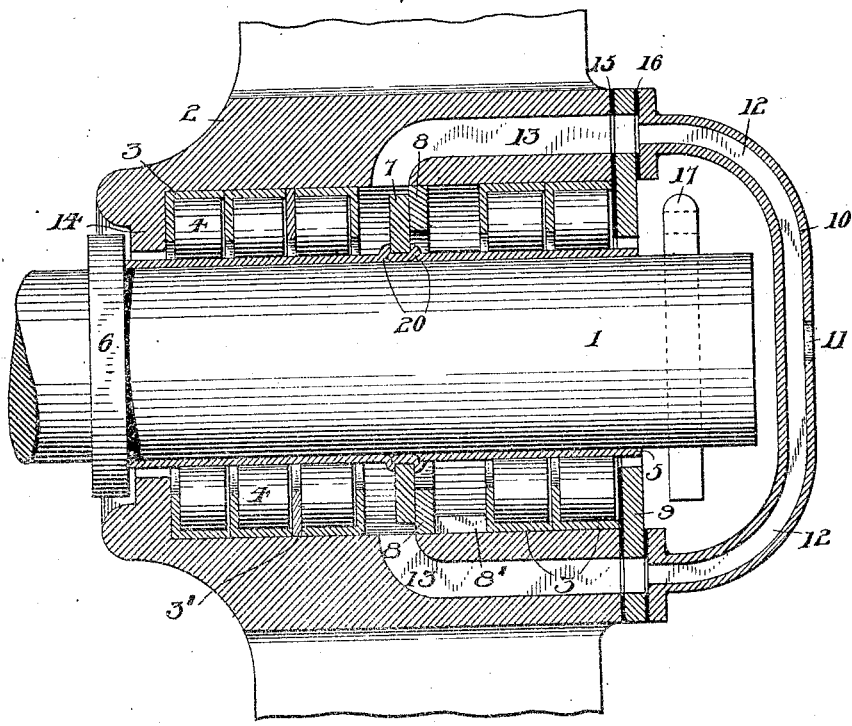
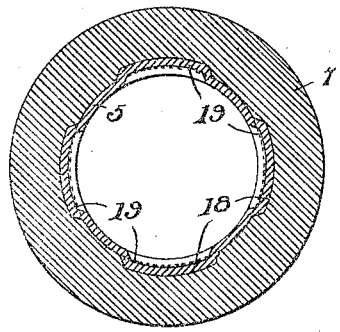
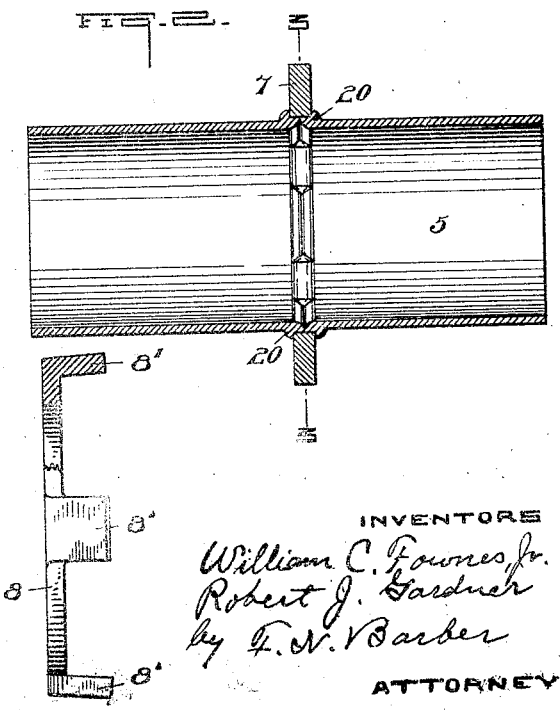
WITNESSES:
INVENTORS
William C. Fownes Jr.
Robert J. Gardner
by F. N. Barber
ATTORNEY

UNITED STATES PATENT OFFICE.

WILLIAM C. FOWNES, JR., AND ROBERT J. GARDNER, OF PITTSBURG, PENNSYLVANIA, ASSIGNORS TO THE S. JARVIS ADAMS COMPANY, OF PITTSBURG, PENNSYLVANIA, A CORPORATION OF PENNSYLVANIA.

MINING-CAR-WHEEL BEARING.

No. 888,700.

Specification of Letters Patent.

Patented May 26, 1908.

Application filed May 15, 1907. Serial No. 373,846.

*To all whom it may concern:*

Be it known that we, WILLIAM C. FOWNES, Jr., and ROBERT J. GARDNER, citizens of the United States, both residing at Pittsburg, in the county of Allegheny and State of Pennsylvania, have invented or discovered new and useful Improvements in Mining-Car-Wheel Bearings, of which the following is a specification.

Our invention relates to improvements in wheels, pulleys, and other rotary devices and its objects are to provide devices of this character which will have the endwise thrusts received by bearings so located as to be thoroughly oiled; which will have well oiled anti-friction bearings; and which will have their parts so constructed as to distribute the wear uniformly.

Referring to the drawings, Figure 1 is a longitudinal section through the hub of a wheel, the axle being in elevation; Fig. 2, a longitudinal section of the thrust sleeve and collar; Fig. 3, a section on the line 3—3 of Fig. 2; and Fig. 4, a side elevation partly in section, showing the bearing 8.

On the drawings, 1 represents the axle and 2 the hub of a wheel rotarily mounted on the axle. The interior of the hub is provided with two series or sets of circular runways or race-rings 3 for the anti-friction rollers 4. The races and rollers are preferably the same as shown in the United States patent, No. 785,944, granted to William C. Fownes, Jr. We have shown two sets of races, with three races in one set, and two in the other, the inner race of the first set being reversed so that its inturned flange faces the thrust collar 7 on the metal sleeve 5. A spacing ring 3' is inserted between the adjacent ends of the two inner races of the first named set. We do not confine ourselves to a definite number of sets or to a definite number of races in a set or to a definite number of races occupied by rollers, or even to the presence of the races and rollers, unless they are specifically named in the claims.

The rollers roll on the outer surface of the metal sleeve 5, which encircles and rotates on the axle and extends from the shoulder or collar 6 on the axle to the outer end of the hub. The sleeve 5 has its inner end in engagement with the shoulder 6 and is provided externally at about the middle of its length with the thrust collar or bearing 7, which lies between the said two sets of races 3, above described.

A second thrust collar or bearing ring 8 surrounds the sleeve 5 and has its inner face in frictional contact with the outer face of the bearing 7. Preferably the bearing ring 8 will have the arms or members 8', which are bent down nearly to a right angle to the body of the bearing 8. When driven into the axial opening in the hub, the arms 8' will, by their elasticity bind against the interior wall of the hub and prevent the rotation of the bearing therein.

The outer end of the hub 2 is covered by the plate 9, which has a central opening for the axle 1, and furnishes an abutment for the outer race 3 and a stop to hold the rollers 4 in the said race.

The hollow oil-conductor 10 is arched over the end of the axle 1 and is attached to diametrically opposite places on the outer end of the hub. The oil-conductor is provided with the inlet opening 11 opposite the center of the axle. The oil introduced through the opening 11 flows through the oil ducts 12 in the said oil-conductor into the ducts 13 which lead through the plate 9 and the hub 2 to points in alinement with the space between the said two sets of races or their equivalent. By this construction the oil is admitted from the oil ducts directly to the bearings 7 and 8 which are the parts of the wheel that sustain the endwise thrusts of the wheel on the axle. In wheels as usually constructed, the said thrusts are taken by the collar 6 and the inwardly extending hub-flange 14 at the inner end of the hub, and by a washer or nut at the outer end thereof. The collar 6 and the flange 14 and adjacent portions of the hub and axle have been found very difficult to be kept well oiled, these parts often becoming dry and worn before their condition became known. With our construction the thrusts are entirely taken from the said flange and collar.

The rotation of the wheel and the action of gravitation cause the flow of oil to the ducts 13. The oil may occupy the spaces about the races and rollers without flowing out at the end of the hub, provided its level is not above the lower edge of the flange 14 or of the opening in the plate 9.

The packing 15 is placed between the hub 1 and the plate 9, and the packing 16, between said plate and the oil-conducting device 10.

The pin 17 is placed through the axle at the outer end of the hub, and serves to prevent the wheel from slipping off from the axle. It will be noticed that this pin or any equivalent device is readily accessible without the necessity of removing the oil-conductor 10.

The sleeve 5 is preferably made loose on the axle so that the same may revolve and thereby distribute the wear uniformly around the same. In car-wheels the under side of the axle becomes worn the most rapidly, as is clear. If our sleeve were rigid on the axle, it would become worn rapidly on its under side. By making the sleeve loose on the axle, it slowly rotates on the axle, thus continually presenting a fresh surface to sustain the pressure and wear of the rollers 4. This feature, while not being absolutely essential in all the embodiments of the present invention, is a very important one, inasmuch as it prolongs the life of the sleeve many times.

The bearing or collar 7 and the sleeve 5 may be connected together in various ways, but we prefer to make the two separate and then unite them rigidly. The bearing 7 is a metal disk having a central opening to receive the sleeve 5, the opening having the same diameter as substantially the external diameter of the sleeve, and also any desired number of recesses 18 extending out beyond the sleeve 5. The bearing or collar 7 is placed over the sleeve at about the center of the latter and is held from rotary movement on the sleeve by means of the projections or bosses 19 which are forced in any desired manner from the sleeve into the said recesses 18 in the bearing. The collar 7 is prevented from longitudinal movement on the sleeve 5 by means of the ribs or folds 20 forced in any desired manner outwardly from the body of the sleeve and into contact with the opposite sides of the collar.

It is readily seen that, as the hub rotates, the rollers will be caused to rotate on the sleeve 5, causing a slow backward rotation of the sleeve. This rotation of the sleeve constantly changes the line of greatest stress or of transverse thrust on the sleeve, so that the latter will not wear continually on a single longitudinal line, but uniformly around the entire circumference of the sleeve. The thrust of the hub longitudinally of the sleeve is resisted in one direction by the engagement of the ring or bearing 8 and the collar 7, which is held from movement to the right by the engagement of the free ends of the arms 8' with the adjacent race 3. A thrust on the hub toward the left will be transmitted from the bearing 8 to the collar 7 and thence to the sleeve 5, which transmits the thrust to the shoulder 6 on the axle 1. A thrust on the hub to the right will be resisted by the pin 17.

We do not limit ourselves to the precise construction shown and described, but desire our claims to cover all devices which are fair equivalents thereof.

We claim—

1. The combination of an axle, a sleeve thereon, a thrust collar encircling the sleeve and distinct therefrom, said sleeve having projections in engagement with the sides of the collar to prevent movement of the collar on the sleeve, a rotatable hub concentric with the sleeve, anti-friction devices between the hub and the sleeve, and a thrust bearing carried by the hub and coöperative with the said thrust collar.

2. The combination of an axle, a sleeve rotatable thereon, a thrust collar encircling the sleeve and distinct therefrom, said sleeve having projections in engagement with the sides of the collar to prevent movement of the collar on the sleeve, a rotatable hub concentric with the sleeve, and a thrust bearing carried by the hub and coöperative with the said thrust collar.

3. The combination of an axle, a sleeve rotatable thereon, a thrust collar on the sleeve, a rotatable hub concentric with the sleeve, anti-friction devices between the hub and the sleeve, race-rings for said anti-friction devices, and a thrust bearing carried by the hub and coöperative at one side with the said thrust collar and at the other side with one of the said race-rings.

4. The combination of an axle, a sleeve thereon, a thrust collar on the sleeve, a rotatable hub concentric with the sleeve, and a thrust bearing carried by the hub and coöperative with the said thrust collar, said sleeve having portions of its wall in recesses in the said thrust collar.

5. The combination of an axle, a sleeve thereon, a thrust collar on the sleeve, a rotatable hub concentric with the sleeve, and a thrust bearing carried by the hub and coöperative with the said thrust collar, said sleeve having annular ribs in engagement with the opposite faces of the said thrust collar.

6. The combination of an axle, a sleeve thereon, a thrust collar on the sleeve, a rotatable hub concentric with the sleeve, and a thrust bearing carried by the hub and coöperative with the said thrust collar, said sleeve having portions of its wall in recesses in the said thrust collar and having annular ribs in engagement with the opposite faces of the said thrust collar.

7. The combination of an axle, a sleeve thereon, a thrust collar on the sleeve, a rotatable hub concentric with the sleeve, and a thrust bearing carried by the hub and coöperative with the said thrust collar, said sleeve having annular folds in engagement with the opposite faces of the said thrust collar.

8. The combination of an axle, a sleeve thereon, a thrust collar on the sleeve, a rotatable hub concentric with the sleeve, and a thrust bearing carried by the hub and coöperative with the said thrust collar, said thrust bearing having resilient arms in engagement with the wall of the axial opening in the hub to prevent the said bearing from rotation therein.

Signed at Pittsburg, Pa., this 13th day of May, A. D. 1907.

WILLIAM C. FOWNES, JR.
ROBERT J. GARDNER.

Witnesses:
F. N. BARBER,
C. E. EGGERS.